(12) United States Patent
Kato et al.

(10) Patent No.: US 9,016,879 B2
(45) Date of Patent: Apr. 28, 2015

(54) PRIMARY MIRROR SUPPORT STRUCTURE AND TELESCOPE UNIT

(71) Applicants: Atsushi Kato, Tokyo (JP); Noboru Kawaguchi, Tokyo (JP)

(72) Inventors: Atsushi Kato, Tokyo (JP); Noboru Kawaguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 143 days.

(21) Appl. No.: 13/800,510

(22) Filed: Mar. 13, 2013

(65) Prior Publication Data

US 2013/0242424 A1   Sep. 19, 2013

(30) Foreign Application Priority Data

Mar. 14, 2012 (JP) .................. 2012-057523

(51) Int. Cl.
| | |
|---|---|
| G02B 5/10 | (2006.01) |
| G02B 7/183 | (2006.01) |
| G02B 23/16 | (2006.01) |
| G02B 23/02 | (2006.01) |

(52) U.S. Cl.
CPC .............. *G02B 7/183* (2013.01); *G02B 23/16* (2013.01); *G02B 23/165* (2013.01); *G02B 23/02* (2013.01)

(58) Field of Classification Search
CPC ...... G02B 23/02; G02B 23/16; G02B 23/165; G02B 26/06; Y02E 10/41; Y02E 10/45; Y02E 10/47; F24J 2/36; F24J 2002/385; F24J 2/52; F24J 2/5201; F24J 2/54; F24J 2/542
USPC .................. 359/846, 399, 849, 872
See application file for complete search history.

(56) References Cited

U.S. PATENT DOCUMENTS

| 4,776,684 | A | 10/1988 | Schmidt-Kaler |
| 6,278,561 | B1 | 8/2001 | Teske et al. |
| 7,125,129 | B2 * | 10/2006 | Oshima et al. ................. 359/849 |
| 7,232,232 | B2 | 6/2007 | Oshima et al. |

(Continued)

FOREIGN PATENT DOCUMENTS

| DE | 35 27 826 A1 | 3/1987 |
| EP | 1 852 727 A1 | 11/2007 |

(Continued)

OTHER PUBLICATIONS

Extended European Search Report issued May 16, 2013 in Patent Application No. 13158788.3.

*Primary Examiner* — Euncha Cherry
(74) *Attorney, Agent, or Firm* — Oblon, McClelland, Maier & Neustadt, L.L.P.

(57) ABSTRACT

The primary mirror support structure comprises an EL rotation structure including two arc-shaped members, a truss structure frame, and a primary mirror support structure. The arc-shaped members face each other via the EL axis and supporting the primary mirror, each of which rotates about the EL axis along an outer surface so as to rotate the primary mirror about the EL axis. The truss structure frame is connected to either one of the arc-shaped members at the ends. The primary mirror support structure includes multiple support members connecting multiple points on the circumference of the primary mirror provided above the truss structure frame to the truss structure frame. At least the support members nearest to the arc-shaped members are connected to the truss structure frame at parts different from the ends at which the truss structure frame is connected to the arc-shaped members.

8 Claims, 9 Drawing Sheets

(56) References Cited

U.S. PATENT DOCUMENTS

| | | |
|---|---|---|
| 2005/0157413 A1 | 7/2005 | Oshima et al. |
| 2005/0183377 A1 | 8/2005 | Johnson |
| 2006/0221473 A1 | 10/2006 | Oshima et al. |
| 2010/0085638 A1 | 4/2010 | Lopresti |

FOREIGN PATENT DOCUMENTS

| | | |
|---|---|---|
| GB | 2 356 943 A | 6/2001 |
| JP | 2005-208227 | 8/2005 |
| JP | 2011-8083 | 1/2011 |
| WO | WO 2006/006240 A1 | 1/2006 |

\* cited by examiner

100# PRIMARY MIRROR SUPPORT STRUCTURE AND TELESCOPE UNIT

CROSS-REFERENCE TO RELATED APPLICATION

This application claims the benefit of Japanese Patent Application No. 2012-057523, filed on Mar. 14, 2012, the entire disclosure of which is incorporated by reference herein.

FIELD

This application relates generally to a supporting structure of a reflecting mirror as applied to an optical telescope, a radio telescope, and the like, and more particularly, to a supporting structure of a primary mirror and a telescope unit having the supporting structure of the primary mirror.

BACKGROUND

Some traditional large telescopes having a diameter of several tens of meters or larger utilize a primary mirror (a primary reflecting mirror) formed by arranging multiple segmented mirrors as described, for example, in International Publication No. 2006/006240. In order to prevent deterioration in the mirror accuracy, actuators correcting the deflected mirror surface may be utilized as described, for example, in Unexamined Japanese Patent Application Kokai Publication No. 2005-208227. Large telescopes having a diameter of several tens of meters or larger have to prevent self-weight deformation of the primary mirror. In such cases, the primary mirror is formed by segmented mirrors as mentioned above and supported at many points with a primary mirror support structure. Therefore, the mirror accuracy of the primary mirror surface (primary reflecting mirror surface) significantly relies on the rigidity of the primary mirror support structure.

In a large telescope, the orientation change due to the elevation angle change may cause self-weight deformation or distortion of the primary mirror support structure. For example, some telescope units are designed to have a significantly large height to reduce the self-weight deformation in attempting to assure a large second moment of area and reduce deformation of the primary mirror support structure.

Some telescopes employ the design concept that reduces the amount of self-weight deformation by providing semicircular rails for driving the elevation angle axis directly below the primary mirror support structure to reduce the distance between the support points.

However, in a telescope of which the primary mirror support structure has a large height, the EL axis (elevation axis) of the telescope is positioned significantly high above the AZ rail plane. Then, the telescope itself has a large height. Consequently, the number of parts is increased and the dome to house the telescope becomes larger.

Furthermore, the base receives a greater load as the size is increased, which presumably leads to scale expansion and term extension of overall construction work including foundation improvement. Then, it is required to ensure the mirror accuracy with fewer parts without increasing the height of the telescope structure. Then, in order to keep the height of the EL axis small and downsize the telescope body and dome, it is suggested that "the height of the EL axis (elevation angle axis) of the telescope is kept small" and "instead of supporting the primary mirror support structure from directly below, an EL rotation structure (semicircular rails) is provided on either side of the primary mirror support structure and the primary mirror support structure is placed in-between to support the primary mirror support structure at both sides."

However, for example, in the case of fixing the ends of the primary mirror support structure to the ends of the EL rotation structure that are apart from each other by several tens of meters, the primary mirror surface sags significantly in the center due to self-weight deformation while virtually no deformation occurs at the ends. Consequently, the mirror accuracy is presumably deteriorated.

In order to correct the curved primary mirror surface (primary mirror), the actuators as described in Unexamined Japanese Patent Application Kokai Publication No. 2005-208227 can be utilized. However, it is not perfect because of restriction on the stroke and the like. In other words, curvature deformation itself in the primary mirror surface due to orientation change of the primary mirror support structure should be prevented.

The present invention is invented to solve the above problem and an exemplary object of the present invention is to provide a primary mirror support structure and telescope unit capable of preventing the curvature deformation itself due to orientation change of the primary mirror.

SUMMARY

In order to achieve the above object, the primary mirror support structure according to the present invention comprises an EL rotation structure including two arc-shaped members, a truss structure frame, and a primary mirror support structure.

The two arc-shaped members of the EL rotation structure are two members facing each other via the EL axis and supporting the primary mirror, each of which rotates about the EL axis along an outer surface disposed the lateral face of a cylinder around the EL axis so as to rotate the primary mirror about the EL axis. The truss structure frame extends between the two arc-shaped members and is connected to either one of the arc-shaped members at the ends.

The primary mirror support structure includes multiple support members connecting multiple points on the circumference of the primary mirror provided above the truss structure frame to the truss structure frame and makes the truss structure frame bear the primary mirror's own weight so as to support the primary mirror.

At least the support members nearest to the arc-shaped members are connected to the truss structure frame at parts different from the ends at which the truss structure frame is connected to the arc-shaped members.

The present invention can prevent the curvature deformation itself due to orientation change of the primary mirror.

BRIEF DESCRIPTION OF THE DRAWINGS

A more complete understanding of this application can be obtained when the following detailed description is considered in conjunction with the following drawings, in which.

DETAILED DESCRIPTION

Figure 1:
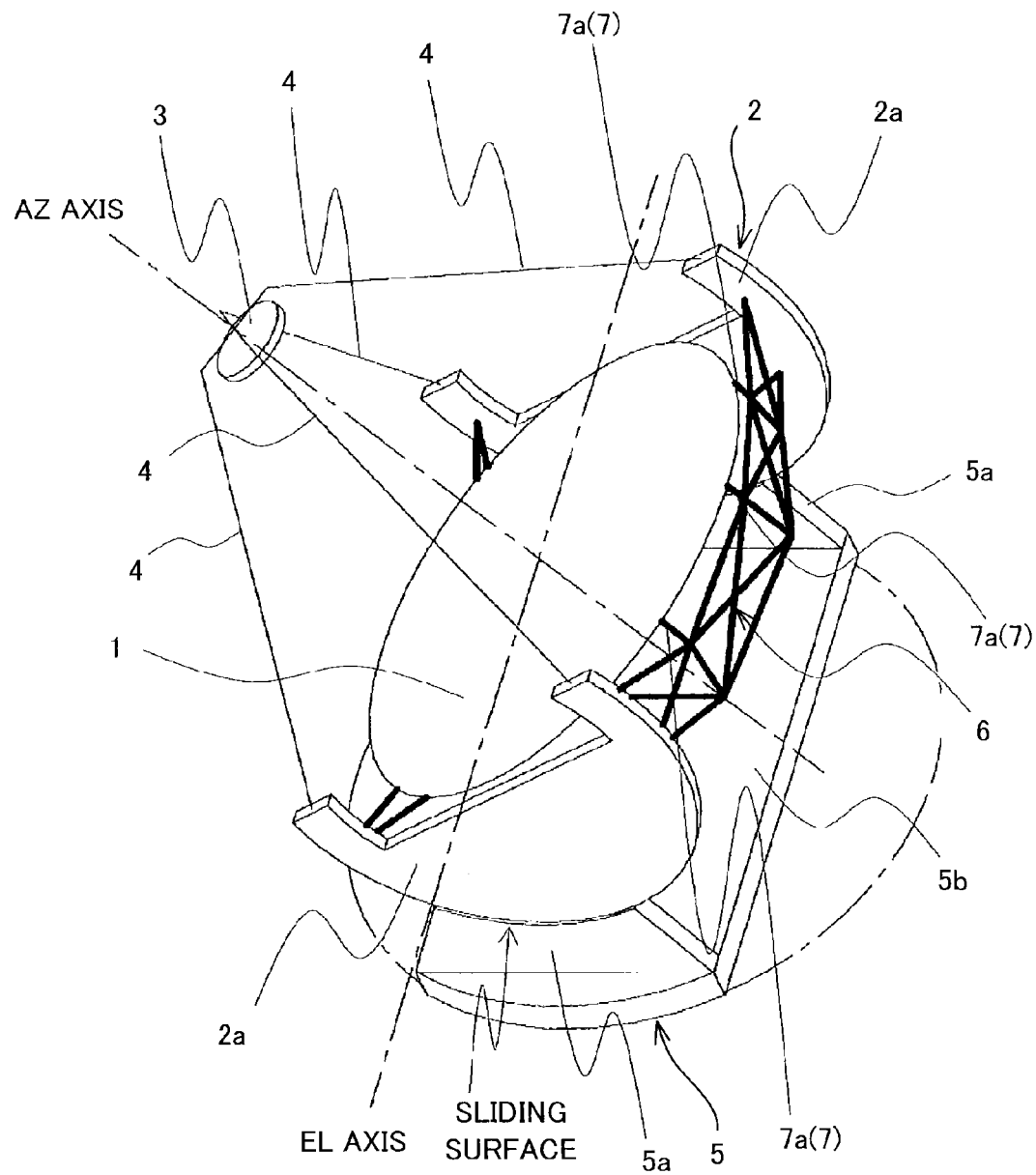
FIG. 1 is a perspective view showing the structure of the primary mirror support structure and telescope unit according to an embodiment of the present invention.

An embodiment of the present invention will be described using FIGS. 1 to 9. FIGS. 1 to 5 show the primary mirror support structure and telescope unit according to this embodiment. FIGS. 6 to 9 show the primary mirror support structure and telescope unit of a reference model for comparison for explaining the effects of the primary mirror support structure and telescope unit according to this embodiment. In the figures, the same reference number presents the same or corresponding part and the detailed explanation thereof will be omitted.

The dash-dot lines in the figures indicate an EL axis and/or an AZ axis. The nature of the present invention resides in a characteristic structure supporting a large reflecting mirror (which is termed a primary mirror in this application). Therefore, the primary mirror support structure and telescope unit according to this embodiment can have a secondary mirror and/or a tertiary mirror. Furthermore, the primary mirror support structure and telescope unit according to this embodiment can comprise elements receiving light (radio waves) collected by the secondary mirror or tertiary mirror.

In this application, the basic behavior of a conventional telescope (telescope unit) applies and the explanation in this regard is omitted.

In FIGS. 1 to 9, a primary mirror 1 is constituted by a primary mirror (reflecting mirror) formed by combining multiple minors (segmented mirrors) or a single primary minor (reflecting mirror). A mechanism (detail of this mechanism is not shown in the figures) is provided to prevent deflection of the primary mirror to a certain degree by using multiple actuator to provide a support onto the surface opposite to the mirror surface of the primary mirror 1. The actuators can be provided within support members 7a, 7b, and 7c described later.

An EL rotation structure 2 rotates the primary mirror 1 in the EL (elevation) axis direction. The EL rotation structure 2 includes two arc-shaped members 2a facing each other via the EL axis.

The arc-shaped members 2a according to an embodiment of the present invention each have a body in the form of an arc-shaped plate including an outer surface disposed the lateral face of a cylinder around the EL axis and having a cutout formed by cutting off a rectangular portion that contains the center part of the arc-shaped plate.

The body of each of the arc-shaped members 2a according to an embodiment of the present invention is, in more details, a nearly semicircular plate member when seen in the EL axis direction. The semicircle is a part of a circle around the EL axis when seen in the EL axis direction. In other words, the outer surface of each of the semicircular arc-shaped members 2a when seen in the EL axis direction corresponds to the outer surface disposed the lateral face of a cylinder around the EL axis. The cutout of the body of each of the arc-shaped members 2a forms a cutout in the center part including part of the diameter when seen in the EL axis direction.

Therefore, the EL axis does not pass through the bodies of the arc-shaped members 2a. In other words, the EL axis is a virtual axis serving as the center of rotation when the bodies of the arc-shaped members 2a slide along their semicircular outer surfaces (sliding surfaces) when seen in the EL axis direction.

A secondary mirror 3 has a secondary mirror provided at the focal point of the primary mirror 1. The focal point can be adjusted with the secondary mirror 3.

A secondary mirror support 4 is connected to the secondary mirror 3 at one end and to the EL rotation structure 2 at the other end, thereby supporting the secondary mirror 3.

An AZ rotation structure 5 slidably supports the arc-shaped members 2a of the EL rotation structure 2 and rotates the primary mirror 1 in the AZ (azimuth) axis direction.

In more details, the AZ rotation structure 5 comprises EL rotation structure supports 5a supporting the arc-shaped members 2a of the EL rotation structure 2 in the manner that they can slide along the sliding surfaces and an AZ mount 5b supporting the EL rotation structure supports 5a and rotating them in the AZ axis direction. In other words, the EL rotation structure 2 is restrained by the AZ mount 5b so as to slide along the sliding surfaces and, then, can rotate about the EL axis.

Figure 2:
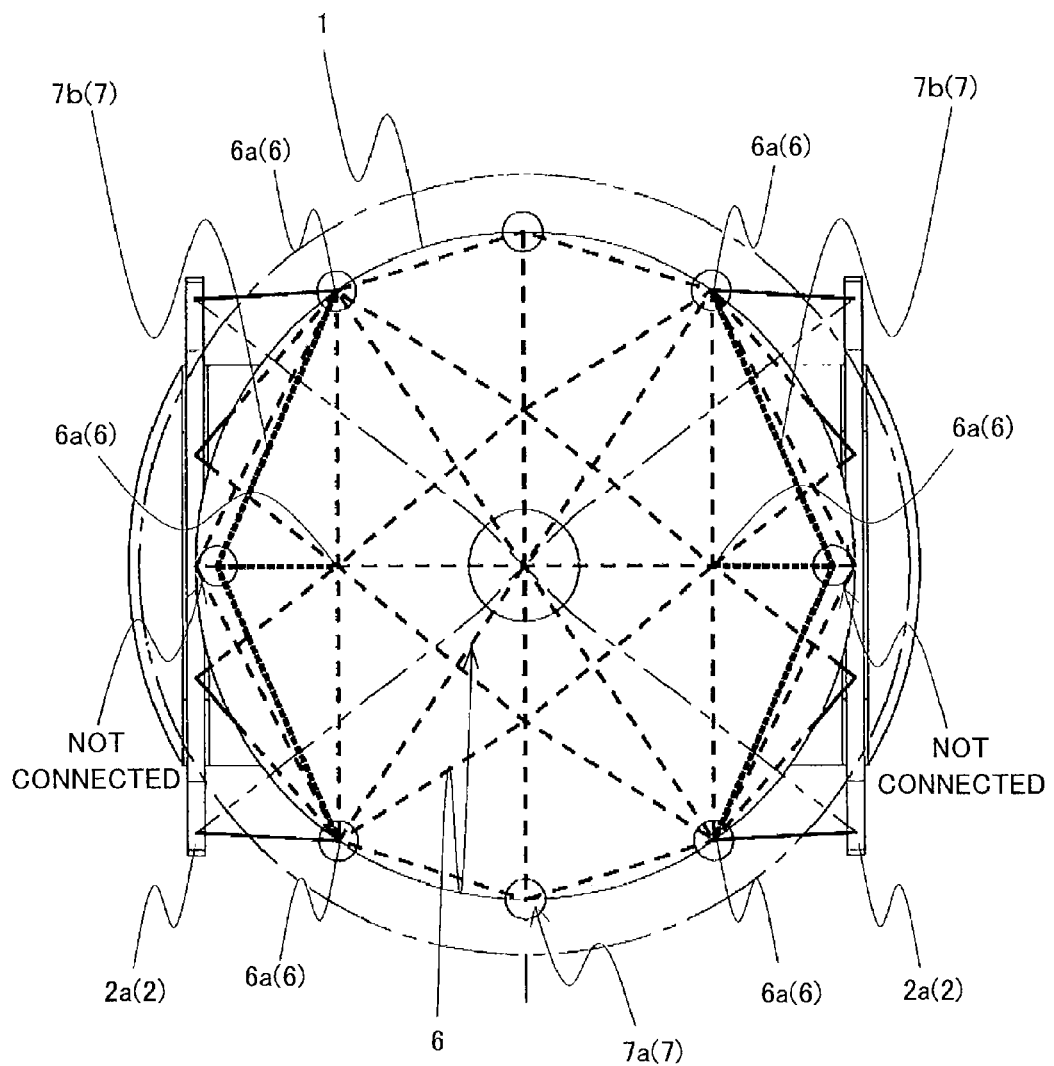
FIG. 2 is a transparent plane view showing the primary mirror of the primary mirror support structure and telescope unit according to an embodiment of the present invention.
Figure 6:
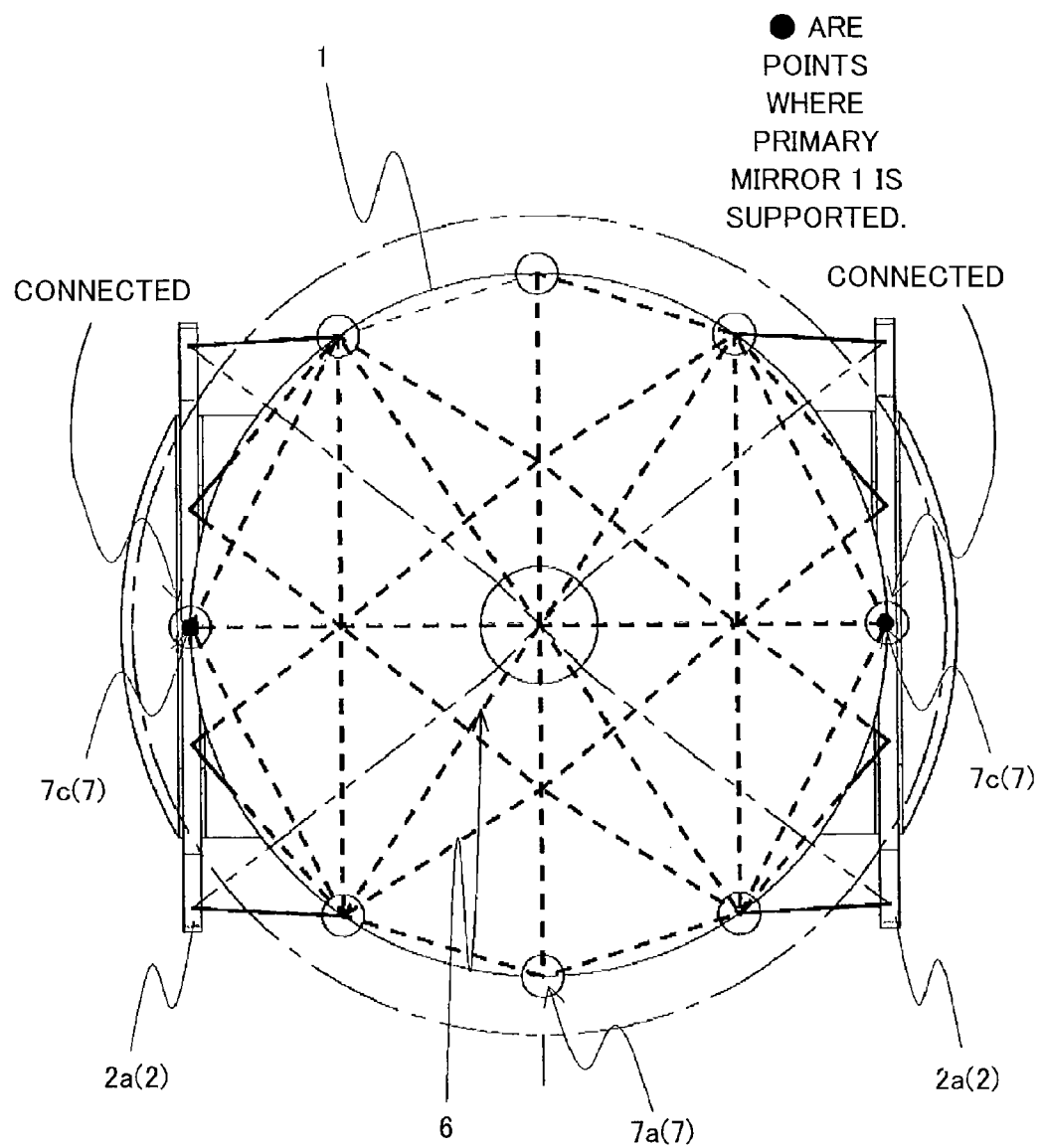
FIG. 6 is a transparent plane view showing the primary mirror of the primary mirror support structure and telescope unit of a reference model shown for comparison with the primary mirror support structure and telescope unit according to an embodiment of the present invention.

The dash-dot circles shown in FIGS. 1, 2, and 6 are the traces of the contour of the AZ mount 5b when the AZ rotation structure 5 (AZ mount 5b) rotates about the AZ axis.

In FIGS. 1 to 9, a truss structure frame 6 is a frame forming a truss structure extending between the two arc-shaped members 2a below the primary mirror 1 and connected to the arc-shaped members 2a at the ends. The truss structure frame 6 includes multiple tubular (plate-like) members forming a truss structure. In more details, the tubular (plate-like) members are joined (coupled) to each other at the end to form a two-dimensional or three-dimensional structure.

Here, the truss structure frame 6 (and a primary mirror support structure 7 described later) is more deformable under load than the arc-shaped members 2a. This is because the truss structure frame 6 (and a primary mirror support structure 7 described later) is a frame consisting of tubular (plate-like) members while the arc-shaped members 2a are plate-like members with which it is easy to ensure strength.

The primary mirror support structure 7 has a structure supporting the primary mirror 1 and comprises multiple tubular (plate-like) support members 7a, 7b, and/or 7c provided above the truss structure frame 6.

The primary mirror support structure 7 according to an embodiment of the present invention supports the primary mirror 1 so that the truss structure frame 6 bears the dead weight of the primary mirror 1. In more details, the primary mirror support structure 7 according to an embodiment of the present invention includes multiple support members 7a and 7b provided above the truss structure frame 6, which are each connected to somewhere (one or multiple points) on the circumference of the primary mirror 1 and to the truss structure frame 6.

The support members 7b constituting the primary mirror support structure 7 according to an embodiment of the present invention are the nearest ones to the arc-shaped members 2a among the support members 7a and 7b constituting the primary mirror support structure 7. The support members 7b are connected to the truss structure frame 6 at points different from the ends at which the truss structure frame 6 is coupled to the arc-shaped members 2a. The connection part where a support member 7b and the truss structure frame 6 are connected forms a structure separator 6a.

Here, the primary mirror support structure 7 also supports the primary mirror 1 at the center and other points that are not on the circumference with multiple support members 7a.

The primary mirror support structure and telescope unit according to an embodiment of the present invention will be described using FIGS. 1 to 5.

Figure 3:
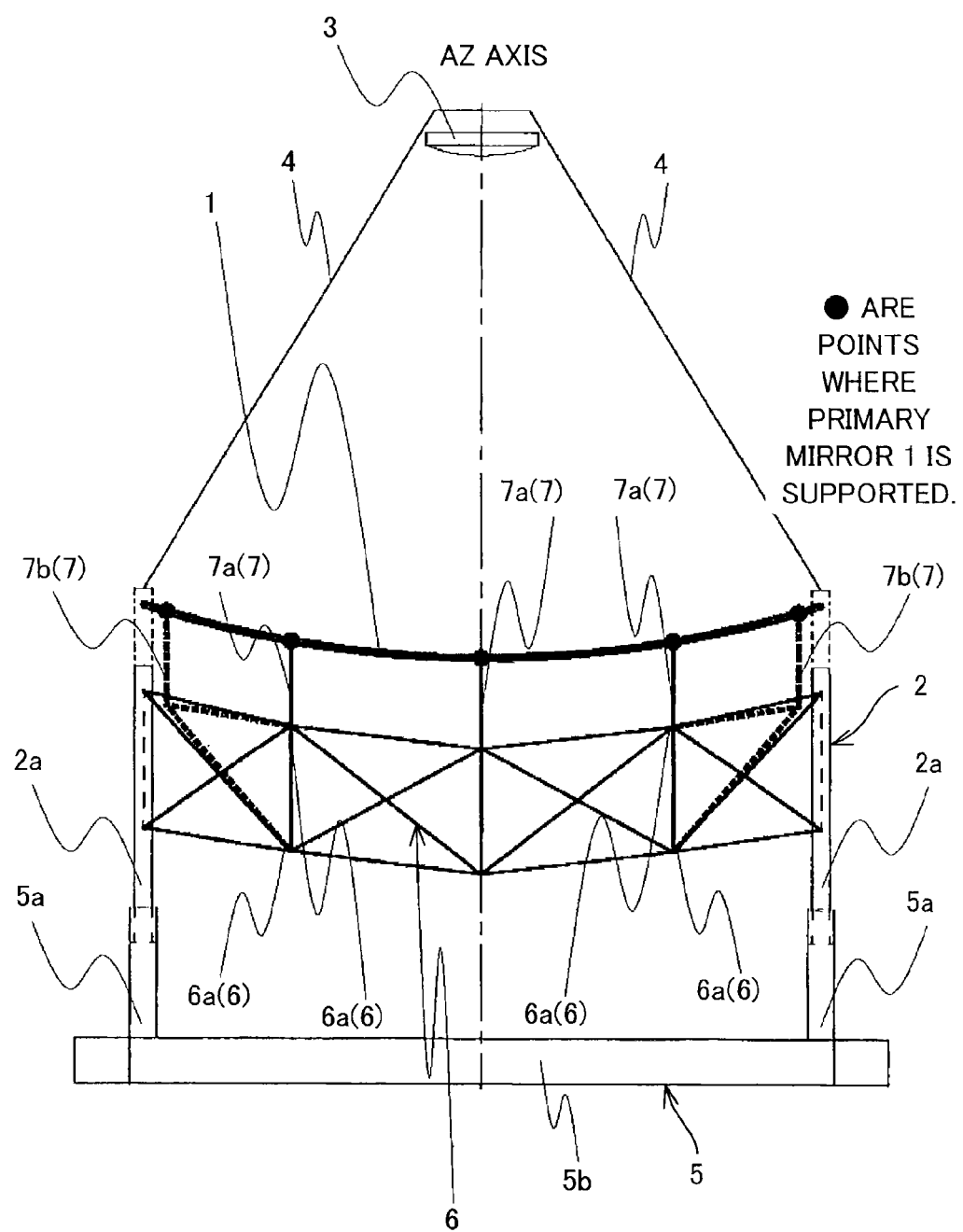
FIG. 3 is a side view of the primary mirror support structure and telescope unit according to an embodiment of the present invention.

FIG. 2 is a transparent plane view showing the primary mirror 1 of the primary mirror support structure and telescope unit according to this embodiment. In this figure, the coarsely dotted lines indicate the truss structure frame 6 and support members 7a and the finely dotted lines indicate the support members 7b. In FIG. 3, the dotted lines (finely dotted lines) indicate the support members 7b. Furthermore, in the same figure, the black dots indicate the points where the primary mirror 1 is supported (support points).

The support members 7a and 7b are not connected to the arc-shaped members 2a (EL rotation structure 2). Therefore, the primary mirror 1's own weight is borne by the arc-shaped members 2a (EL rotation structure 2) via the support members 7a and 7b and truss structure frame 6, not by the arc-shaped members 2a (EL rotation structure 2) only via the support members 7a and 7b.

Figure 4:
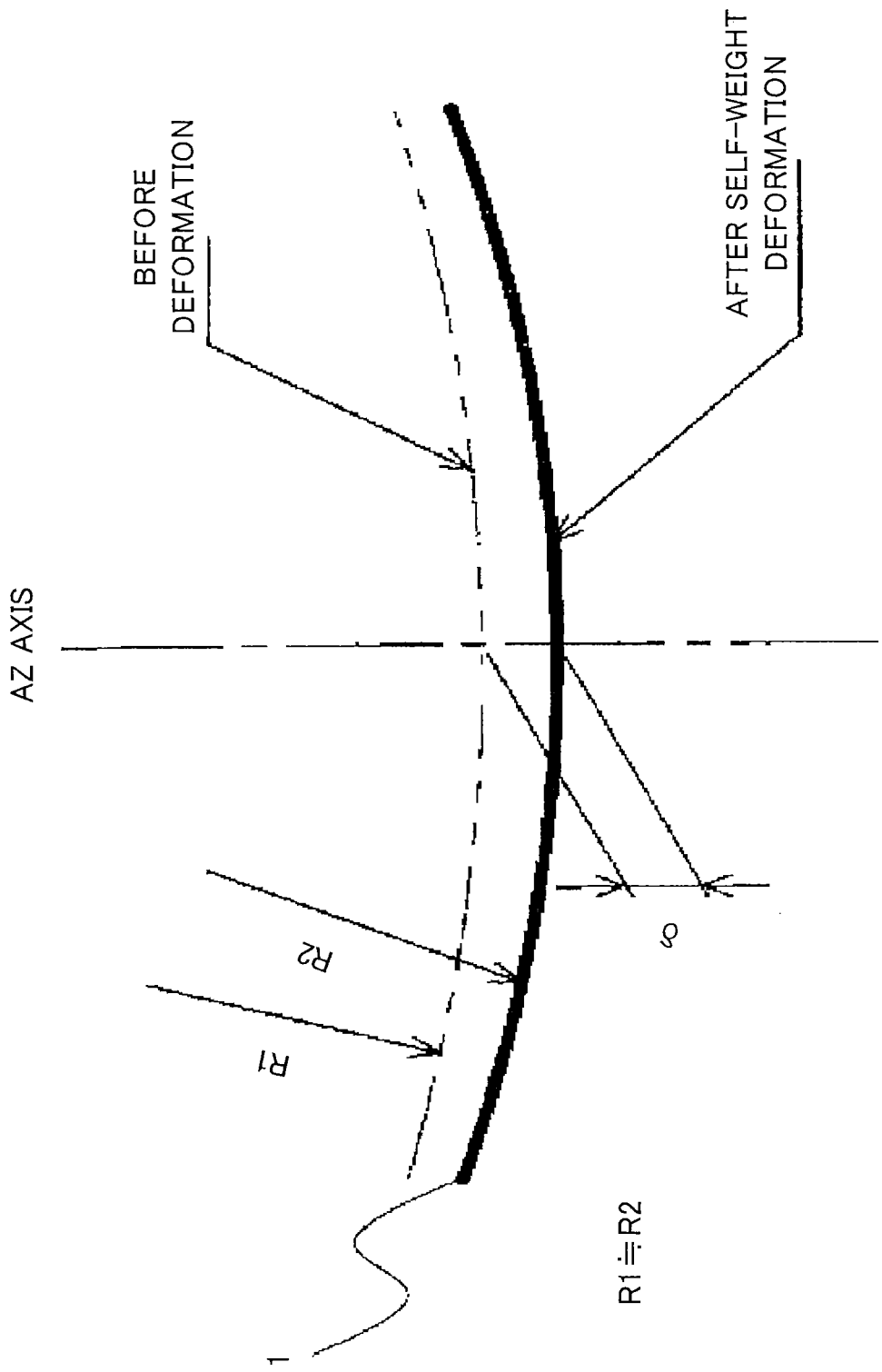
FIG. 4 is an enlarged view of the primary mirror schematically showing deflection of the primary mirror of the primary mirror support structure and telescope unit according to an embodiment of the present invention.

FIG. 4 is an enlarged view of the primary mirror 1 of the primary mirror support structure and telescope unit according to this embodiment, schematically showing deflection of the primary mirror 1. The dash-dot-dot line in the figure indicates the shape of the primary mirror 1 before self-weight deformation, namely the shape of the primary mirror 1 when self-weight deformation is neglected. The solid line in the figure indicates the shape of the primary mirror 1 after self-weight deformation, namely the shape of the primary mirror 1 when self-weight deformation is taken into account.

Figure 5:
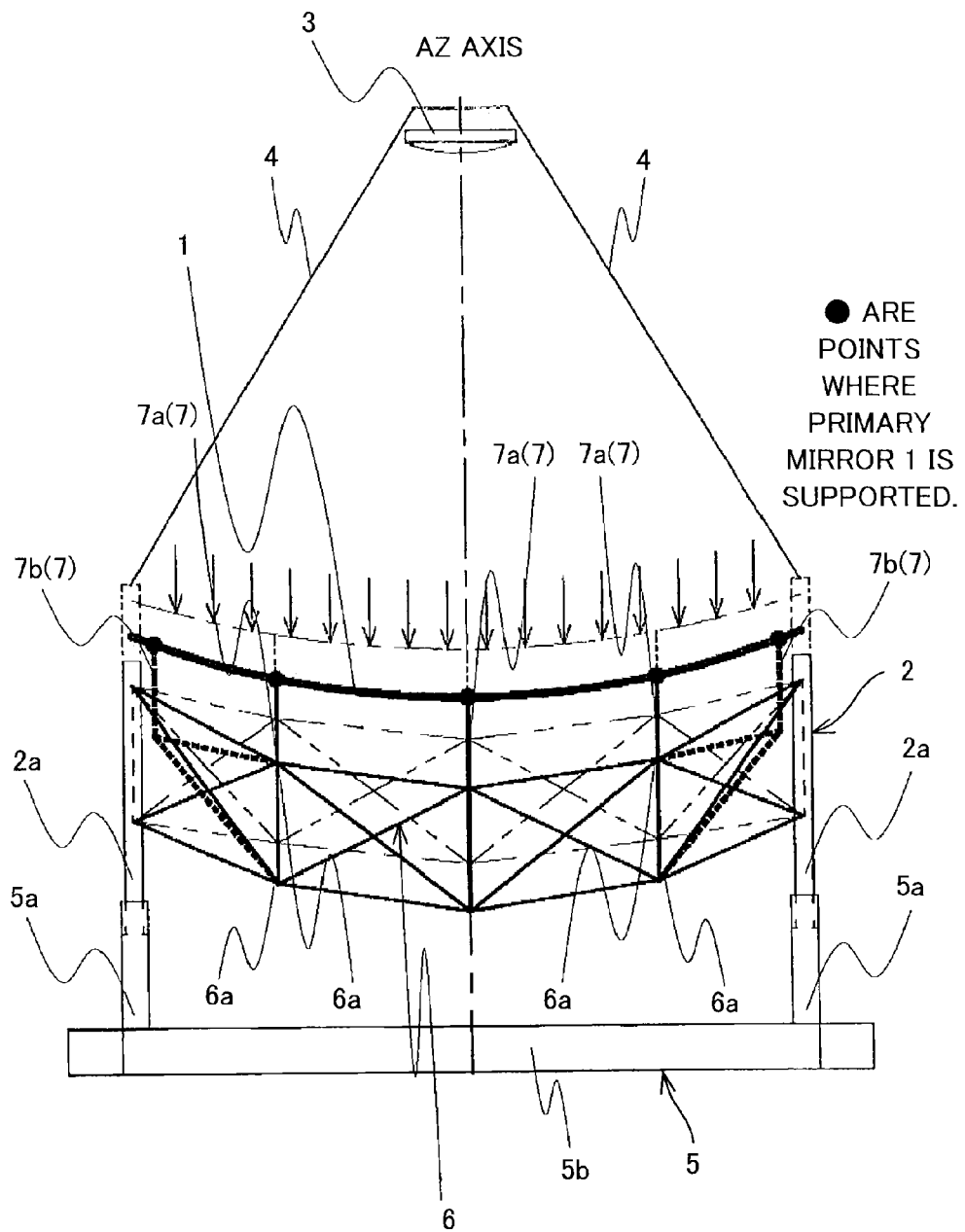
FIG. 5 is an overall view schematically showing deflection of the primary mirror of the primary mirror support structure and telescope unit according to an embodiment of the present invention.

FIG. 5 is an overall view of the primary mirror support structure and telescope unit according to this embodiment, schematically showing deflection of the primary mirror 1. The dash-dot-dot lines in the figure indicate the shape of the truss structure frame 6 before sagging under downward load from the primary mirror 1's own weight, in other words, the shape when self-weight deformation of the primary mirror 1 is neglected. The solid lines in the figure indicate the shape of the truss structure frame 6 after sagging under downward load from the dead weight of the primary mirror 1, namely the shape when self-weight deformation of the primary mirror 1 is taken into account. The dotted lines (finely dotted lines) in the figure indicate the support members 7b. The downward arrows in the figure schematically indicate the load applied on the primary mirror 1 due to its own weight. The black dots in the figure indicate the points where the primary mirror 1 is supported (support points).

The primary mirror support structure and telescope unit according to this embodiment will be described in detail.

As shown in FIGS. 1 to 3, the primary mirror 1 and EL rotation structure 2 are not directly connected via the support members 7a and 7b. They are connected via the support members 7a and 7b and truss structure frame 6. Therefore, the EL rotation structure 2 rotates the primary mirror 1 about the EL axis via the support members 7a and 7b and truss structure frame 6.

The secondary mirror 3 and EL rotation structure 2 are directly connected via the secondary mirror support 4. Therefore, the EL rotation structure 2 rotates the secondary mirror 3 via the secondary mirror support 4.

On the other hand, the AZ rotation structure 5 supports the EL rotation structure 2 with the EL rotation structure supports 5a. Therefore, as understood from the relationship among the EL rotation structure 2, primary mirror 1, and secondary mirror 3, the AZ rotation structure 5 can rotate the primary mirror 1 and secondary mirror 3 about the AZ axis.

As shown in FIGS. 2 and 3, the support members 7a are connected to the lower part of the primary mirror 1 at one end. The support members 7a extend below the primary mirror 1 from that end. The support members 7a are connected to the truss structure frame 6 at the other end.

The support members 7b that are the nearest support members to the arc-shaped members 2a are connected to the lower part of the primary mirror 1 at one end. The support members 7b extend below the primary mirror 1 from that end. The other ends of the support members 7b are connected to the truss structure frame 6 at the structure separators 6a. The structure separators 6a are parts of the truss structure frame 6 and different from "the ends at which the truss structure frame 6 is connected to the arc-shaped members 2a."

With the above structure, the load from the primary mirror 1 supported by the support members 7b nearest to the arc-shaped members 2a is not directly applied to the EL rotation structure 2 (arc-shaped members 2a).

Furthermore, the above-described structure separators 6a of the truss structure frame 6 where the other ends of the support members 7b are connected are also parts where multiple tubular (plate-like) members forming the truss structure frame 6 are joined (coupled) to each other at the end. In this way, the support members 7b can form another truss structure branched from the truss structure frame 6 having a truss structure (a double truss structure). Then, the support members 7b can have sufficient strength.

For example, each support member 7b extends downward along the arc-shaped member 2a with a predetermined distance from the arc-shaped member 2a. At the extended end, the support member 7b branches into three (sufficiently, two or more) and turns away from "the end at which the truss structure frame 6 is connected to the arc-shaped member 2a."

In other words, the support member 7b forms a truss structure with multiple tubular (plate-like) members that are joined (coupled) to each other at the end to form a two-dimensional or three-dimensional structure. Hence, the support member 7b and truss structure frame 6 can easily form the above-mentioned double truss structure in which the arc-shaped members 2a and truss structure frame 6 are joined (coupled) at the structure separators 6a.

At and near the points where the tubular (plate-like) members constituting the support members 7b are joined (coupled) to each other at the end, each support member 7b "extends downward along the arc-shaped member 2a with a given distance from the arc-shaped member 2a and, at the extended end, branches into three (sufficiently, two or more) and turns."

Then, the load from the primary mirror 1 supported by the support members 7b nearest to the arc-shaped members 2a is not directly applied to the arc-shaped members 2a. The load from the primary mirror 1 supported by the support members 7b is mainly applied to the truss structure frame 6 between the facing arc-shaped members 2a via the structure separators 6a in the inward direction of the truss structure frame 6. Therefore, as shown in FIGS. 4 and 5, the primary mirror support structure 7 consisting of multiple support members 7a and support members 7b conveys the load from the primary mirror 1 of the truss structure frame 6.

Then, assuming that the distance over which the center of the primary mirror 1 goes down due to its own weight is δ as shown in FIG. 4, with provision of the support members 7b, the distance over which the nearest parts of the primary mirror 1 to the arc-shaped members 2a go down can easily be not much different from δ.

Having the above-described primary mirror support structure 7, the primary mirror support structure and telescope unit according to an embodiment can prevent the curvature of the primary mirror (or the primary mirror surface that is the mirror surface thereof) of the primary mirror 1 from changing due to orientation change of the primary mirror 1. Then, even if an EL rotation mechanism such as the EL rotation structure 2 is provided, the primary mirror 1 can be supported while preventing the primary mirror 1 from deflecting or deforming to the extent that the actuators for correcting the curved primary mirror cannot correct it.

The support members 7b branch to form a truss structure and, at the branched ends, are connected to the truss structure frame 6. Therefore, the primary mirror support structure and telescope unit according to this embodiment has a double truss structure comprising a first truss structure formed by the truss structure frame 6 (and the support members 7a possibly included) and a second truss structure formed by the support members 7b. In this sense, the support members 7b can be termed double truss structure members 7b. Here, the primary mirror support structure 7 and truss structure frame 6 can be termed a primary mirror support structure.

The support members 7b forming a truss structure are coupled to the truss structure frame 6. Therefore, it is possible to prevent reduction in the natural vibration frequency of the primary mirror surface of the primary mirror 1 and ensure the rigidity of the primary mirror support structure.

The primary mirror support structure and telescope unit according to this embodiment can reduce the difference in sagging between the center of the primary minor surface and the sides of the primary mirror surface (the parts of the primary mirror near the arc-shaped members 2a) of the primary mirror 1, which deteriorates the mirror accuracy of the primary mirror 1.

Furthermore, the primary mirror surface of the primary mirror 1 simply makes offsetting moves (parallel shift) while virtually maintaining the mirror accuracy (curvature). Therefore, with the focal point being adjusted with the secondary mirror 3, the focal point displaced as a result of positional change of the primary mirror surface of the primary mirror 1 can be corrected.

FIGS. 6 to 9 show a reference model of the primary mirror support structure and telescope unit. This reference model is given for comparison with the primary mirror support structure and telescope unit according to this embodiment for explaining the effects of the primary mirror support structure and telescope unit according to this embodiment.

Figure 7:
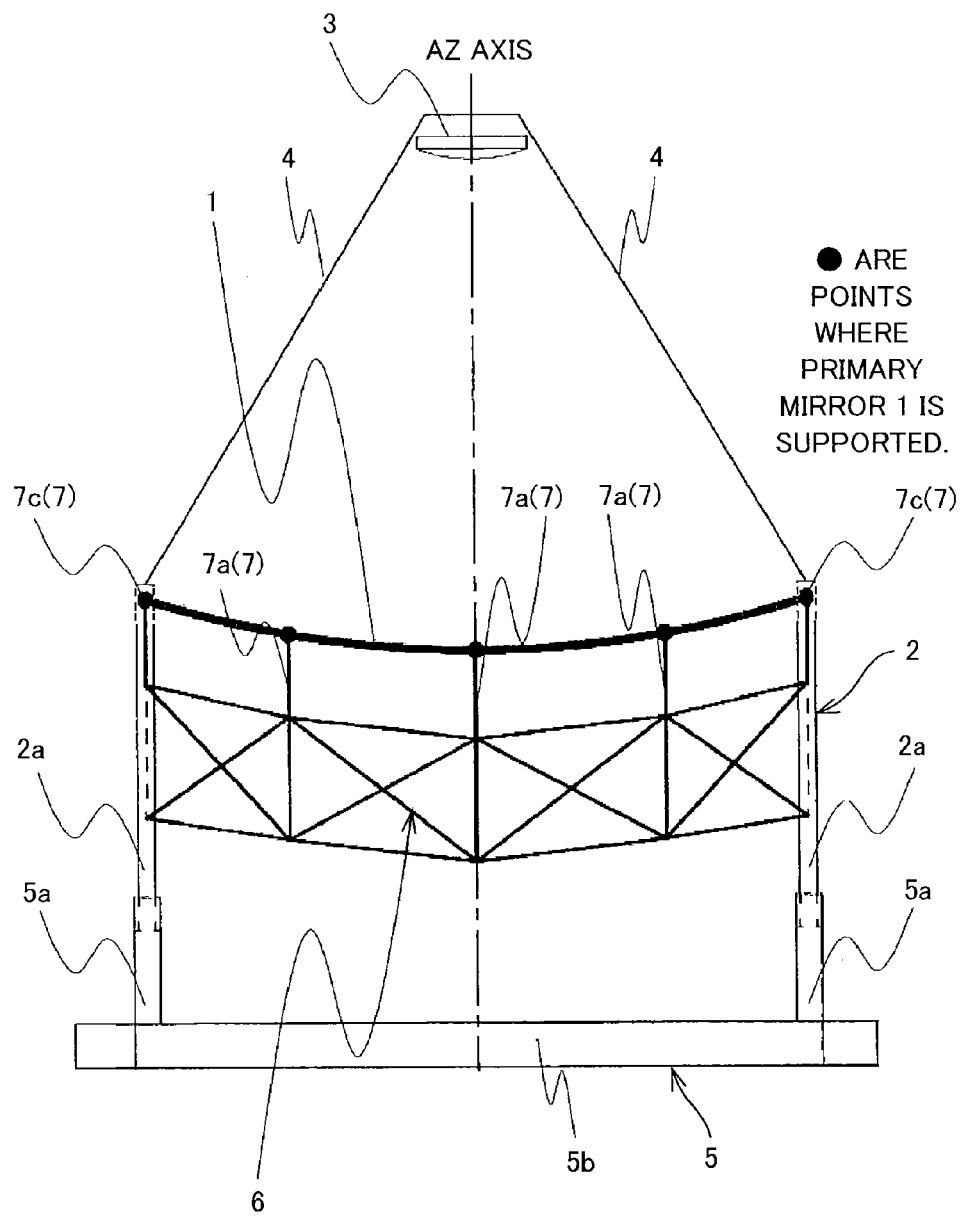
FIG. 7 is a side view of the primary mirror support structure and telescope unit of a reference model given for comparison with the primary mirror support structure and telescope unit according to an embodiment of the present invention.

FIG. 6 is a transparent plane view showing the primary mirror 1 of the primary mirror support structure and telescope unit of the reference model. In the figure, the coarsely dotted lines indicate the truss structure frame 6 and support members 7a. In the figure, the members with an arrow and notation "connected" are support members 7c, which are connected to the arc-shaped members 2a (EL rotation structure 2). The primary mirror 1's own weight is borne by the arc-shaped members 2a (EL rotation structure 2) only via the support members 7c. In FIG. 7, the support members 7c are indicated by dashed lines. The support members 7c are among the support members forming the primary mirror support structure 7 of the reference model and members similar to the support members 7a. In FIGS. 6 and 7, the dots indicate the points where the primary mirror 1 is supported (support points).

Figure 8:
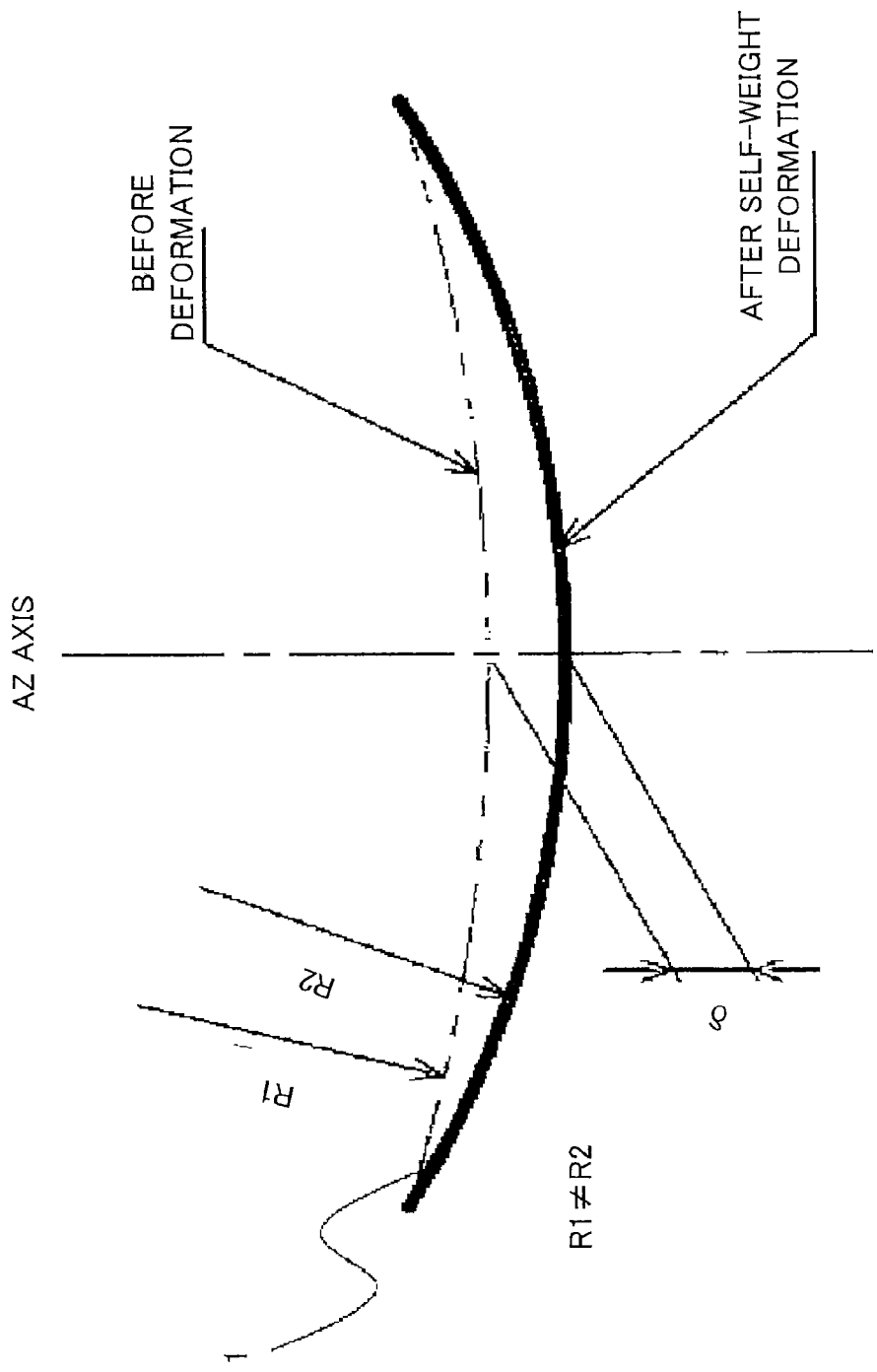
FIG. 8 is an enlarged view of the primary mirror schematically showing deflection of the primary mirror of the primary mirror support structure and telescope unit of a reference model shown for comparison with the primary mirror support structure and telescope unit according to an embodiment of the present invention.

FIG. 8 is an enlarged view of the primary mirror 1 schematically showing deflection of the primary mirror of the primary mirror support structure and telescope unit of the reference model. The dash-dot-dot line in the figure indicates the shape of the primary mirror 1 before self-weight deformation, namely the shape of the primary mirror 1 when self-weight deformation is neglected. The solid line in the figure indicates the shape of the primary mirror 1 after self-weight deformation, namely the shape of the primary mirror 1 when self-weight deformation is taken into account.

Figure 9:
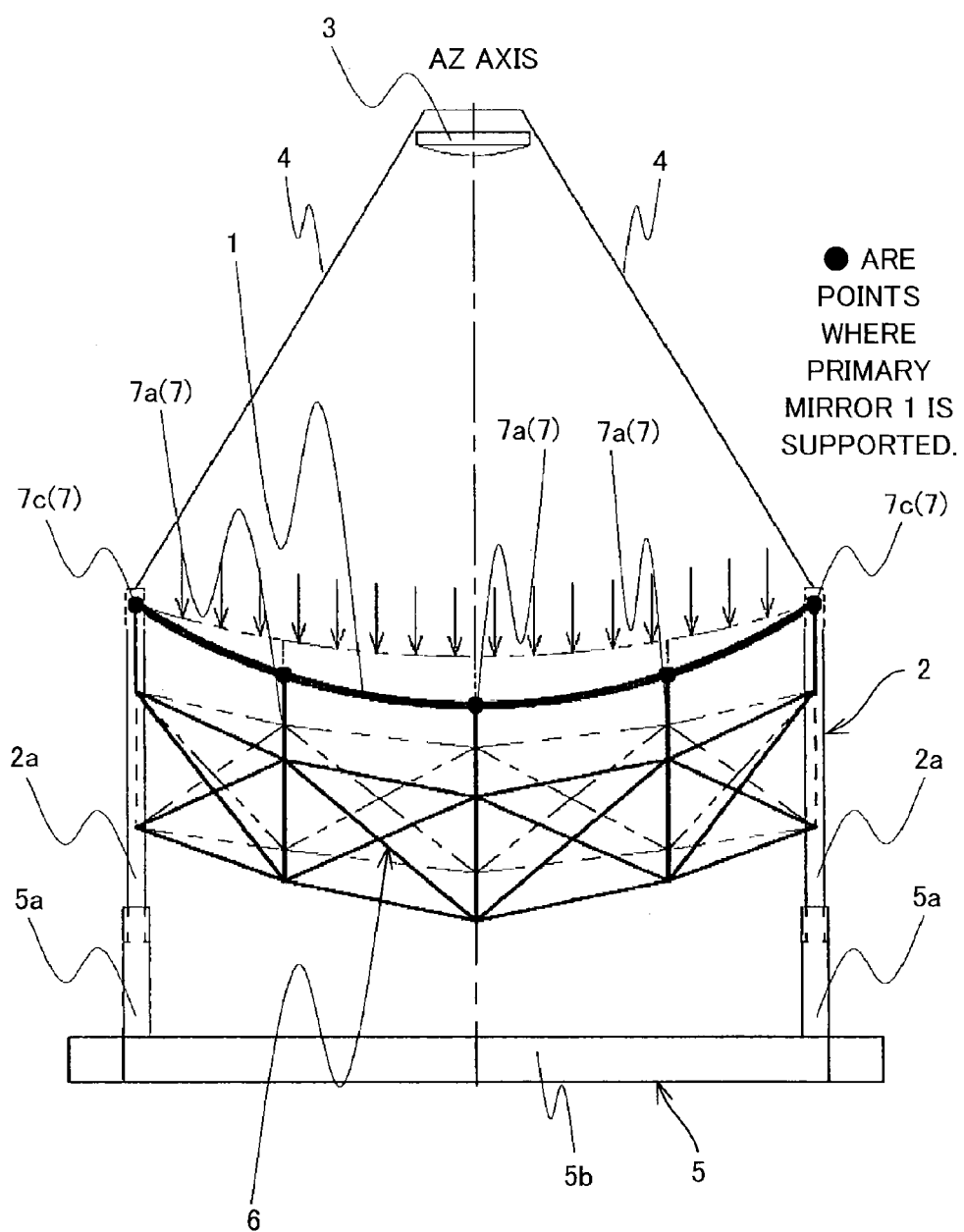
FIG. 9 is an overall view schematically showing deflection of the primary mirror of the primary mirror support structure and telescope unit of a reference model given for comparison with the primary mirror support structure and telescope unit according to an embodiment of the present invention.

FIG. 9 is an overall view schematically showing deflection of the primary mirror of the primary mirror support structure and telescope unit of the reference model. The dash-dot-dot lines in the figure indicate the shape of the truss structure frame 6 before sagging under downward load from the primary mirror 1's own weight, in other words, the shape when self-weight deformation of the primary mirror 1 is neglected. The solid lines in the figure indicate the shape of the truss structure frame 6 after sagging under downward load from the dead weight of the primary mirror 1, namely the shape when self-weight deformation of the primary mirror 1 is taken into account. The black dots in the figure indicate the points where the primary mirror 1 is supported (support points), and particularly the points 7c indicate the points where the primary mirror 1 is supported by the support members 7c. The downward arrows in the figure schematically indicate the load applied on the primary mirror 1 due to its own weight.

The primary mirror support structure and telescope unit of the reference model given for comparison will be described in detail.

In this reference model, the primary mirror 1 and EL rotation structure 2 are directly connected via the support members 7c. Therefore, the EL rotation structure 2 rotates the primary mirror 1 about the EL axis via the support members 7a and 7c and truss structure frame 6.

The secondary mirror 3 and EL rotation structure 2 are directly connected via the secondary mirror support 4. Therefore, the EL rotation structure 2 rotates the secondary mirror 3 via the secondary mirror support 4.

On the other hand, the AZ rotation structure 5 supports the EL rotation structure 2 with the EL rotation structure supports 5a. Therefore, as understood from the relationship among the EL rotation structure 2, primary mirror 1, and secondary mirror 3, the AZ rotation structure 5 can rotate the primary mirror 1 and secondary mirror 3 about the AZ axis.

As shown in FIGS. 6 and 7, the support members 7a are connected to the lower part of the primary mirror 1 at one end. The support members 7 extend below the primary mirror 1 from that end. The support members 7a are connected to the truss structure frame 6 at the other end.

The support members 7c that are the nearest support members to the arc-shaped members 2a are also connected to the lower part of the primary mirror 1 at one end. Extending downward, the support members 7c are connected to the truss structure frame 6 at the other end. In more details, the other ends of the support members 7c are connected to the truss structure frame 6 at "the ends at which the truss structure frame 6 is connected to the arc-shaped members 2a."

The ends of the support members 7c can be connected directly to the arc-shaped members 2a near "the ends at which the truss structure frame 6 is connected to the arc-shaped members 2a." Furthermore, the positions of the arc-shaped members 2a can be used to function as the support members 7c. In such a case, the arc-shaped members 2a directly support the primary mirror 1 at the nearest parts thereto. Then, the load from the primary mirror 1 supported by the support members 7c nearest to the arc-shaped members 2a or an equivalent load thereto is applied to the EL rotation structure 2 (arc-shaped members 2a).

With the above structure, the load from the primary mirror 1 supported by the support members 7c nearest to the arc-shaped members 2a is directly applied to the arc-shaped members 2a. Hence, as shown in FIGS. 8 and 9, the primary mirror support structure 7 consisting of multiple support members 7a and support members 7c conveys the load from the primary mirror 1 to the truss structure frame 6.

Then, assuming that the distance over which the center of the primary mirror 1 goes down due to its own weight is δ as shown in FIG. 8, with provision of the support members 7c (arc-shaped members 2a), the distance over which the nearest parts of the primary mirror 1 to the arc-shaped members 2a go down is smaller than δ.

This is because the primary mirror support structure 7 consisting of multiple support members 7a and support members 7c and the truss structure frame 6 are more deformable under load than the arc-shaped members 2a; therefore, the arc-shaped members 2a are subject to relatively less deformation under the load from the primary mirror 1.

In other words, the primary mirror support structure 7 is coupled and fixed to the EL rotation structure 2 at either side (the parts of the primary mirror 1 near the arc-shaped members 2a) and, consequently, the ends of the primary mirror 1 are also coupled to the EL rotation structure 2. Then, the quantity of self-weight deformation of the primary mirror 1 is restricted by the EL rotation structure 2.

If the above structure rotates about the EL axis and the primary mirror support structure 7 deforms due to its own weight, the primary mirror 1 barely deforms at either end but deforms in the center. Consequently, the primary mirror of the primary mirror 1 deforms in the manner the center part go down more than the ends, deviating from an ideal minor surface (see FIG. 9) and deteriorating the mirror accuracy.

In other words, the primary mirror surface of the primary mirror 1 cannot maintain the mirror accuracy because of a significant difference between the curvature R1 before self-weight deformation and the curvature R2 after self-weight deformation (see FIG. 8). Then, because of the difference in self-weight deformation of the primary mirror 1, the primary mirror (or the primary mirror surface that is the mirror surface thereof) of the primary mirror 1 has the curvature changed and deviates from an ideal mirror surface. Such deterioration in the mirror accuracy cannot be corrected even if the focal point is adjusted with the secondary mirror 3.

On the other hand, in the primary mirror support structure and telescope unit according to an embodiment of the present invention, the primary mirror support structure 7 is not coupled and fixed to the EL rotation structure 2 at either side (the parts of the primary mirror 1 near the arc-shaped members 2a). In other words, in the primary mirror support structure and telescope unit according to an embodiment of the present invention, the primary mirror support points by the EL rotation structure 2 and support members 7b are separated. Furthermore, the EL rotation structure 2 and support members 7b are not coupled. Therefore, the above problem with the primary mirror support structure and telescope unit according to the reference model given for comparison does not occur.

In more details, the primary mirror support structure and telescope unit according to an embodiment of the present invention comprises a structure making small the relative difference in deformation between the center and sides of the primary mirror support structure 7. In other words, the support members 7b supporting the primary mirror at the primary mirror support points on the sides of the primary mirror 1 are provided. Then, the support members 7b are separated from the EL rotation structure 2 (so that no force is directly transferred) and form a branched primary mirror support structure. In this way, a truss structure supporting the primary mirror 1 (the primary mirror surface) is formed without restriction from the EL rotation structure 2.

Then, the original members of a double structure are fixed to the EL rotation structure 2 as they are and, therefore, the rigidity of the primary mirror support structure 7 is not reduced. Furthermore, the support members 7b, which are additional members for a double truss structure, also form a truss structure from the structure separators 6a, preventing reduction in the rigidity.

The primary mirror support structure and telescope unit according to an embodiment of the present invention comprises the above characteristic structure. Even if the primary mirror or primary mirror surface deforms due to its own weight, the primary mirror support structure 7 is under no influence of restriction from the EL rotation structure 2. The primary mirror or primary mirror surface deforms or sags relatively equally in the center and at the sides as with the double truss structure. Consequently, the primary mirror surface undergoes almost no difference between the curvature R1 before self-weight deformation and the curvature R2 after self-weight deformation. The primary mirror surface makes offsetting moves (parallel shift) while maintaining the mirror accuracy (see FIG. 4). With the focal point adjusted with the secondary mirror 3 in this state, a predetermined level of accuracy can be obtained. Then, self-weight deformation of the primary mirror 1 will not be much different among any points thereof, not deviating from an ideal mirror surface.

Use of the structure in which the primary mirror support structure 7 is provided to the EL rotation structure 2 (between the arc-shaped members 2a) allows the telescope structure to keep the height small. Even with this structure, the primary mirror support structure and telescope unit according to an embodiment of the present invention can keep the self-weight deformation small and virtually maintain the mirror accuracy. Consequently, it will easily be made possible to reduce the actuator stroke for adjusting the primary mirror surface of the primary mirror 1, simplify the primary mirror support structure (the structure not requiring a high level of rigidity), reduce the number of structural parts, reduce the height of the EL axis, and/or downsize the dome housing the telescope unit.

The present invention is suitably used for primary mirror support structures supporting a large primary mirror having a diameter of several tens of meters or larger and telescopes comprising a large primary mirror.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A primary mirror support structure, comprising:
an EL rotation structure including two arc-shaped members facing each other and supporting a primary mirror, each of which rotates about an EL axis along an outer surface for sliding along a sliding surface disposed on the lateral face of a cylinder around the EL axis so as to rotate the primary mirror about the EL axis;
a truss structure frame extending between the two arc-shaped members below the primary mirror and connected to the arc-shaped members at the ends; and
a primary mirror support structure including multiple support members, each of the multiple support members connecting one point or multiple points on the circumference of the primary mirror to the truss structure frame and making the truss structure frame bear the primary mirror's own weight so as to support the primary mirror, wherein
at least the support members nearest to the arc-shaped members are connected to the truss structure frame at parts different from the ends at which the truss structure frame is connected to the arc-shaped members, and
the primary mirror's own weight is borne by the arc-shaped members via the support members and the truss structure frame.

2. The primary mirror support structure according to claim 1, wherein:
the support members nearest to the arc-shaped members turn away from the ends at which the truss structure frame is connected to the arc-shaped members, and are connected to the truss structure frame at parts different from the ends at which the truss structure frame is connected to the arc-shaped members.

3. The primary mirror support structure according to claim 2, wherein:
the support members nearest to the arc-shaped members extend downward along the arc-shaped members with a distance from the arc-shaped members, branch and turn away from the ends at which the truss structure frame is connected to the arc-shaped members at the extended end, and are connected to the truss structure frame at parts different from the ends at which the truss structure frame is connected to the arc-shaped members.

4. A telescope unit, comprising:
a primary mirror;
an EL rotation structure including two arc-shaped members facing each other and supporting the primary mirror, each of which rotates about an EL axis along an outer surface for sliding along a sliding surface disposed on the lateral face of a cylinder around the EL axis so as to rotate the primary mirror about the EL axis;
an AZ rotation structure supporting and sliding the two arc-shaped members of the EL rotation structure so as to rotate the primary mirror about the AZ axis;
a truss structure frame extending between the two arc-shaped members below the primary mirror and connected to the arc-shaped members at the ends; and
a primary mirror support structure including multiple support members, each of the multiple support members connecting one point or multiple points on the circumference of the primary mirror to the truss structure frame and making the truss structure frame bear the primary mirror's own weight so as to support the primary mirror, wherein
at least the support members nearest to the arc-shaped members are connected to the truss structure frame at parts different from the ends at which the truss structure frame is connected to the arc-shaped members, and
the primary mirror's own weight is borne by the arc-shaped members via the support members and the truss structure frame.

5. The telescope unit according to claim 4, wherein:
the support members nearest to the arc-shaped members turn away from the ends at which the truss structure frame is connected to the arc-shaped members, and are connected to the truss structure frame at parts different from the ends at which the truss structure frame is connected to the arc-shaped members.

6. The telescope unit according to claim 5, wherein:
the support members nearest to the arc-shaped members extend downward along the arc-shaped members with a distance from the arc-shaped members, branch and turn away from the ends at which the truss structure frame is connected to the arc-shaped members at the extended end, and are connected to the truss structure frame at parts different from the ends at which the truss structure frame is connected to the arc-shaped members.

7. The primary mirror support structure according to claim 1, wherein the truss structure frame and the primary mirror support structure are more deformable under load than the arc-shaped members.

8. The telescoping unit according to claim 4, wherein the truss structure frame and the primary minor support structure are more deformable under load than the arc-shaped members.

* * * * *